United States Patent [19]
McGee et al.

[11] Patent Number: 5,854,385
[45] Date of Patent: Dec. 29, 1998

[54] COATING COMPOSITIONS WITH LOW MOLECULAR WEIGHT CARBAMATE OR UREA COMPONENT

[75] Inventors: John D. McGee; Brian D. Bammel, both of Highland, Mich.; Todd A. Seaver, Fort Wayne, Ind.; Walter H. Ohrbom, Hartland Township, Mich.; John W. Rehfuss, West Bloomfield, Mich.; Gregory G. Menovcik, Farmington Hills, Mich.; Paul J. Harris, West Bloomfield, Mich.

[73] Assignee: BASF Corporation, Southfield, Mich.

[21] Appl. No.: 698,529

[22] Filed: Aug. 15, 1996

Related U.S. Application Data

[63] Continuation of Ser. No. 540,274, Oct. 6, 1995, abandoned.

[51] Int. Cl.$^6$ .............................. C07K 1/00; C07K 14/00; C07K 16/00; C07K 17/00

[52] U.S. Cl. ..................... 528/369; 524/537; 525/410; 525/414; 525/450; 525/452; 525/453; 528/228; 528/354; 528/359

[58] Field of Search ..................... 524/590, 591, 524/839, 840, 537; 525/410, 414, 450, 452, 453; 528/228, 354, 359, 369

[56] References Cited

U.S. PATENT DOCUMENTS

| | | | |
|---|---|---|---|
| 2,842,523 | 7/1958 | Tousignant et al. | 260/69 |
| 3,474,072 | 10/1969 | Bissinger et al. | 260/49 |
| 3,959,201 | 5/1976 | Chang | 260/851 |
| 4,024,113 | 5/1977 | Ammons | 260/77.5 D |
| 4,101,603 | 7/1978 | Smith et al. | 260/850 |
| 4,111,910 | 9/1978 | Baggett | 528/196 |
| 4,160,754 | 7/1979 | Schapel et al. | 528/254 |
| 4,340,497 | 7/1982 | Knopf | 252/188.3 |
| 4,506,064 | 3/1985 | Mark | 528/176 |
| 4,520,167 | 5/1985 | Blank et al. | 525/131 |
| 4,618,635 | 10/1986 | Osborn et al. | 524/113 |
| 4,628,076 | 12/1986 | Chang et al. | 525/440 |
| 4,631,320 | 12/1986 | Parekh et al. | 525/452 |
| 4,751,112 | 6/1988 | Smith, Jr. et al. | 427/388.3 |
| 4,814,382 | 3/1989 | Hoy et al. | 525/113 |
| 4,847,329 | 7/1989 | Koleske et al. | 525/162 |
| 5,115,025 | 5/1992 | Koleske et al. | 525/162 |
| 5,134,205 | 7/1992 | Blank | 525/509 |
| 5,212,015 | 5/1993 | Mitra et al. | 428/412 |
| 5,225,461 | 7/1993 | Kamikado et al. | 523/415 |
| 5,252,671 | 10/1993 | Pedain et al. | 525/124 |
| 5,300,328 | 4/1994 | Rehfuss | 427/388.3 |
| 5,336,566 | 8/1994 | Rehfuss | 428/524 |
| 5,356,669 | 10/1994 | Rehfuss et al. | 427/407.1 |
| 5,360,644 | 11/1994 | Briggs et al. | 427/410 |
| 5,373,069 | 12/1994 | Rehfuss et al. | 525/456 |
| 5,451,656 | 9/1995 | Menovcik et al. | 528/288 |

FOREIGN PATENT DOCUMENTS

| | | |
|---|---|---|
| B-62220/90 | 3/1992 | Australia . |
| 636660 | 2/1995 | European Pat. Off. . |
| WO 87/00851 | 2/1987 | WIPO . |
| WO 94/10211 | 5/1994 | WIPO . |

*Primary Examiner*—Patrick D. Niland
*Attorney, Agent, or Firm*—Anne Gerry Sabourin

[57] ABSTRACT

A coating composition is disclosed that includes:

(A) a multi-functional compound having
  (1) at least one carbamate or urea functional group,
  (2) at least one other functional group which may or may not be carbamate or urea, and
  (3) at least one hydrogen bond acceptor group that is not also a hydrogen bond donor group, with the proviso that said multi-functional compound is other than an acrylic polymer or oligomer having carbamate functional or urea groups appended to the acrylic backbone through acrylic ester side chains, a polyester polymer or oligomer that is the polycondensation reaction product of a polyol and a polyacid component, or a polyurethane that is the reaction product of a polyisocyanate component and a polyester polyol component, and (B) a curing agent comprising a plurality of groups that are reactive with the functional groups on compound (A).

27 Claims, No Drawings

COATING COMPOSITIONS WITH LOW MOLECULAR WEIGHT CARBAMATE OR UREA COMPONENT

This is a continuation of application Ser. No. 08/540,274, filed Oct. 6, 1995, now abandoned.

FIELD OF THE INVENTION

This invention relates to curable coating compositions, particularly to curable compositions utilizing a carbamate- or urea-functional compound as one of the components of the composition.

BACKGROUND OF THE INVENTION

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberations at the surface of the coating in order to achieve the desired visual effect such as high distinctness of image (DOI).

Such coatings are especially susceptible to a phenomenon known as environmental etch. Environmental etch manifests itself as spots or marks on or in the finish of the coating that often cannot be rubbed out.

It is also often desirable to provide options of different types of carbamate- or urea-functional materials to provide coatings with a good combination of properties such as durability, hardness, flexibility, and resistance to scratching, marring, solvents, and acids.

Curable coating compositions based on curable components having carbamate or urea functionality have been proposed have been described in the art to provide etch-resistant coatings, e.g., U.S. Pat. No. 5,356,669 and WO 94/10211. Non-polymeric carbamate-functional compounds for coating compositions have been described in U.S. Pat. No. 5,336,566 and EP 636,660.

In order to obtain the smooth finishes that are often highly desirable in the coatings industry, coating compositions preferably tend to be fluid in nature, and to exhibit good flow. Good flow is observed when the coating composition is fluid enough at some point after it is applied to the substrate and before it cures to a hard film so that the surface of the coating takes on a smooth appearance. Some coating compositions exhibit good flow immediately upon application and others exhibit good flow when heated. One way to impart fluid characteristics and good flow to a coating composition is to incorporate volatile organic solvents into the compositions. These solvents can provide the desired fluidity and flow during the coating process, after which they evaporate, leaving only the coating components behind. However, the use of such solvents also increases the volatile organic content (VOC) of the coating composition. Because of the adverse impact VOC has on the environment, many government regulations impose limitations on the amount of solvent that can be used. It would thus be desirable to utilize coating composition components that provide good fluidity and flow to the coating composition without the need for large amounts of solvent.

Because of their other beneficial properties, it would also be desirable to provide carbamate- or urea- functional compounds for use in coating compositions that do not require large quantities of solvent.

SUMMARY OF THE INVENTION

According to the present invention, there is provided a coating composition comprising
  (A) a multi-functional compound comprising
    (1) at least one carbamate or urea functional group,
    (2) at least one other functional group which may or may not be carbamate or urea, and
    (3) at least one hydrogen bond acceptor group that is not also a hydrogen bond donor group, with the proviso that said multi-functional compound is other than an acrylic polymer or oligomer having carbamate functional or urea groups appended to the acrylic backbone through acrylic ester side chains, a polyester polymer or oligomer that is the polycondensation reaction product of a polyol and a polyacid component, or a polyurethane that is the reaction product of a polyisocyanate component and a polyester polyol component, and
  (B) a curing agent comprising a plurality of groups that are reactive with the functional groups on compound (A).

It has now been discovered that the incorporation of hydrogen bond acceptor groups into carbamate- or urea-functional compounds reduces the need for organic solvents in coating compositions. These compounds also can impart to coating compositions the ability to spray apply at high viscosities while still maintaining good flow and appearance characteristics. The present invention can also provide other beneficial properties that are often found in coating compositions containing relatively high amounts of solvent, such as good sag resistance, leveling, low orange peel, gloss, wetting of the substrate, and pigment dispersing and loading, and uniform cure. Certain specific carbamate-functional materials that happened to contain hydrogen bond acceptor groups have been disclosed in the art (i.e., acrylic polymers or oligomers having carbamate functional or urea groups appended to the acrylic backbone through acrylic ester side chains, polyester polymers or oligomers that are the polycondensation reaction products of a polyol and a polyacid component, and a polyurethanes that are the reaction product of a polyisocyanate component and a polyester polyol component). However, there has been no teaching or suggestion in the art that incorporation of hydrogen bond acceptor groups can improve the coating performance of a wide variety of carbamate- or urea-functional compounds, as set forth in the present invention.

DESCRIPTION OF THE PREFERRED EMBODIMENTS

The compound (A) used in the present invention is a multifunctional compound having at least one carbamate or urea functional group. Carbamate groups can generally be characterized by the formula

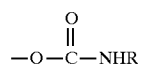

wherein R is H or alkyl, preferably of 1 to 4 carbon atoms. Preferably, R is H or methyl, and more preferably R is H. Urea groups can generally be characterized by the formula

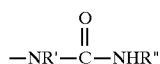

wherein R' and R" each independently represents H or alkyl, preferably of 1 to 4 carbon atoms, or R' and R" may together form a heterocyclic ring structure (e.g., where R' and R" form an ethylene bridge).

The other functional group(s) on compound (A) may be carbamate or urea, or may be other functional groups. Examples of such other functional groups include hydroxyl groups, amino groups, epoxy groups, isocyanate groups, siloxane or silane groups, mercapto groups, substituted or unsubstituted amides, anhydrides, activated methylene groups (activated, for example, by acetoacetate groups). For some of these groups (e.g., epoxy groups), a single curing agent (B) may not be reactive with both the carbamate or urea functional group and the other functional group. In such cases, it may be desirable to include more than one curing agent (B) in the coating composition in order to obtain full curing of the composition.

The compound (A) also comprises at least one group that is a hydrogen bond acceptor, but not a hydrogen bond donor. Hydrogen bond acceptor groups are well-known in the art. They often include electronegative atoms having lone electron pairs, but also can include aromatic or unsaturated groups having π electrons available to accept a proton from the hydrogen bond donor. Hydrogen bond acceptor groups include ester groups, ether groups, ketone groups, carbonate groups, tertiary amine groups, thione groups, sulfone groups, amide groups that are fully substituted on the nitrogen atom (i.e., tertiary amides), and sulfide groups. These groups may be present in combination and/or repeating units, e.g., polyester groups, polyether groups, polycarbonate groups. Some groups can function as either hydrogen bond donors or hydrogen bond acceptors. These include carboxylic acid groups, urethane or urea groups having at least one hydrogen attached to the nitrogen atom, hydroxyl groups, and amides having at least one hydrogen attached to the nitrogen atom. Such groups are not included within the scope of the (A)(3) according to the invention.

Acrylic polymers or oligomers having carbamate functional or urea groups appended to the acrylic backbone through acrylic ester side chains, polyester polymers or oligomers that are the polycondensation reaction products of a polyol and a polyacid component, and a polyurethanes that are the reaction product of a polyisocyanate component and a polyester polyol component are not included within the scope of (A) compounds according to the present invention. Such compounds have been taught in the art (e.g., U.S. Pat. Nos. 5,356,669 and 5,451,656), and contain both carbamate or urea functional groups as well as hydrogen bond acceptor groups (i.e., ester groups). However, such disclosures do not teach or suggest other compounds containing both hydrogen bond acceptor groups and carbamate or urea functional groups, such as those of the present invention or the advantages that can be provided thereby.

There are a number of different synthetic approaches for preparing multifunctional (A) compounds having at least one carbamate or urea functional group. The approaches described below are intended by way of enablement and exemplification of techniques for the preparation of such compounds, not by way of limitation. Those skilled in the art will be able to prepare different types of (A) compounds in different ways than illustrated below, once in possession of the knowledge of the present invention of combining carbamate or urea functionality with hydrogen bond acceptor groups in low molecular weight materials.

In one preferred embodiment of the invention, compound (A) be prepared by reacting a hydroxy carboxylic acid (e.g., dimethylhydroxy propionic acid, tartaric acid, lactic acid, hydroxy stearic acid, N-(2-hydroxyethyl)ethylene diamine triacetic acid, 2-hydroxyethyl benzoic acid) with a hydroxy carbamate or a hydroxy urea to transesterify the hydroxyl on the carbamate or urea compound with the acid group on the hydroxy carboxylic acid. The resulting compound has a carbamate or urea functional group, a hydroxyl functional group, and an ester hydrogen bond acceptor group. This reaction is preferably performed at temperatures of room temperature to 150° C., also preferably with a polymer-supported catalyst such as Amberlyst® 15 (Rohm & Haas). The reaction mixture should contain an excess of the alcohol to minimize self-condensation of the hydroxy carboxylic acid. carbamate or urea is used to ring-open the lactone, conversion of the group to a carbamate or urea can be accomplished during or after the ring-opening reaction.

Compounds having a carbamate or urea group and an active hydrogen group are known in the art. Hydroxypropyl carbamate and hydroxyethyl ethylene urea, for example, are well known and commercially available. Amino carbamates are described in U.S. Pat. No. 2,842,523. Hydroxyl ureas may also be prepared by reacting an oxazolidone with ammonia or a primary amine or by reacting ethylene oxide with ammonia to form an amino alcohol and then reacting the amine group of that compound or any other amino alcohol with hydrochloric acid, then urea to form a hydroxy urea. Amino ureas can be prepared, for example, by reacting a ketone with a diamine having one amine group protected from reaction (e.g., by steric hindrance), followed by reaction with HNCO (i.e., the product of the thermal decomposition of urea), and then water. Alternatively, these compounds can be prepared by starting with a compound having an active hydrogen and a group that can be converted to carbamate or urea as described below, and then converting that group to the carbamate or urea prior to commencement of the lactone ring-opening reaction.

Groups that can be converted to carbamate include cyclic carbonate groups, epoxy groups, and unsaturated bonds. Cyclic carbonate groups can be converted to carbamate groups by reaction with ammonia or a primary amine, which ring-opens the cyclic carbonate to form a β-hydroxy carbamate. Epoxy groups can be converted to carbamate groups by first converting to a cyclic carbonate group by reaction with $CO_2$. This can be done at any pressure from atmospheric up to supercritical $CO_2$ pressures, but is preferably under elevated pressure (e.g., 60–150 psi). The temperature for this reaction is preferably 60°–150° C. Useful catalysts include any that activate an oxirane ring, such as tertiary amine or quaternary salts (e.g., tetramethyl ammonium bromide), combinations of complex organotin halides and alkyl phosphonium halides (e.g., , $(CH_3)_3SnI$, $Bu_4SnI$, $Bu_4PI$, and $(CH_3)_4PI$), potassium salts (e.g., $K_2CO_3$, KI) preferably in combination with crown ethers, tin octoate, calcium octoate, and the like. The cyclic carbonate group can then be converted to a carbamate group as described above. Any unsaturated bond can be converted to carbamate groups by first reacting with peroxide to convert to an epoxy group, then with $CO_2$ to form a cyclic carbonate, and then with ammonia or a primary amine to form the carbamate.

Other groups, such as hydroxyl groups or isocyanate groups can also be converted to carbamate groups to form a compound (A')(1). However, if such groups were to be present on the compound (A')(1) and then converted to carbamate after the ring-opening reaction with the lactone, they would have to be blocked so that they would not react with the lactone or with the active hydrogen groups involved in the lactone ring-opening reaction. When blocking these groups is not feasible, the conversion to carbamate or urea would have to be completed prior to the lactone ring-opening reaction. Hydroxyl groups can be converted to carbamate groups by reaction with a monoisocyanate (e.g., methyl isocyanate) to form a secondary carbamate group or with cyanic acid (which may be formed in situ by thermal decomposition of urea) to form a primary carbamate group (i.e., unsubstituted carbamates). This reaction preferably occurs in the presence of a catalyst as is known in the art. A hydroxyl group can also be reacted with phosgene and then ammonia to form a compound having primary carbamate group(s), or by reaction of a hydroxyl with phosgene and then a primary amine to form a compound having secondary carbamate groups. Another approach is to react an isocyanate with a compound such as hydroxyalkyl carbamate to form a carbamate-capped isocyanate derivative. For example, one isocyanate group on toluene diisocyanate can be reacted with hydroxypropyl carbamate, followed by reaction of the other isocyanate group with an excess of polyol to form a hydroxy carbamate. Finally, carbamates can be prepared by a transesterification approach where hydroxyl group reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Groups such as oxazolidone can also be converted to urea after the ring-opening reaction with the lactone. For example, hydroxyethyl oxazolidone can be used to initiate the ring-opening reaction with the lactone, followed by reaction of ammonia or a primary amine with the oxazolidone to generate the urea functional group.

Other groups, such as amino groups or isocyanate groups can also be converted to urea groups to form a compound (A')(1). However, if such groups were to be present on the compound (A')(1) and then converted to urea after the ring-opening reaction with the lactone, they would have to be blocked so that they would not react with the lactone or with the active hydrogen groups involved in the lactone ring-opening reaction. When blocking these groups is not feasible, the conversion to carbamate or urea would have to be completed prior to the lactone ring-opening reaction. Amino groups can be converted to urea groups by reaction with a monoisocyanate (e.g., methyl isocyanate) to form a secondary urea group or with cyanic acid (which may be formed in situ by thermal decomposition of urea) to form a primary urea group. This reaction preferably occurs in the presence of a catalyst as is known in the art. An amino group can also be reacted with phosgene and then ammonia to form a compound having primary urea group(s), or by reaction of an amino group with phosgene and then a primary amine to form a compound having secondary urea groups. Another approach is to react an isocyanate with a hydroxy urea compound to form a urea-capped isocyanate derivative. For example, one isocyanate group on toluene diisocyanate can be reacted with hydroxyethyl ethylene urea, followed by reaction of the other isocyanate group with an excess of polyol to form a hydroxy carbamate.

One preferred class of compounds having an active hydrogen group and a group that can be converted to carbamate is the hydroxyalkyl cyclic carbonates. Hydroxyalkyl cyclic carbonates can be prepared by a number of approaches. Certain hydroxyalkyl cyclic carbonates like 3-hydroxypropyl carbonate (i.e., glycerine carbonate) are commercially available. Cyclic carbonate compounds can be synthesized by any of several different approaches. One approach involves reacting an epoxy group-containing compound with $CO_2$, under conditions and with catalysts as described hereinabove. Epoxides can also be reacted with β-butyrolactone in the presence of such catalysts. In another approach, a glycol like glycerine is reacted at temperatures of at least 80° C. with diethyl carbonate in the presence of a catalyst (e.g., potassium carbonate) to form a hydroxyalkyl carbonate. Alternatively, a functional compound containing a ketal of a 1,2-diol having the structure:

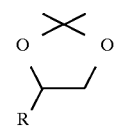

can be ring-opened with water, preferably with a trace amount of acid, to form a 1,2-glycol, which is then further reacted with diethyl carbonate to form the cyclic carbonate.

Cyclic carbonates typically have 5-6-membered rings, as is known in the art. Five-membered rings are preferred, due to their ease of synthesis and greater degree of commercial availability. Six-membered rings can be synthesized by reacting phosgene with 1,3-propane diol under conditions known in the art for the formation of cyclic carbonates. Preferred hydroxyalkyl cyclic carbonates used in the practice can be represented by the formula:

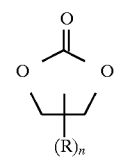

where R (or each instance of R if n is more than 1) is a hydroxyalkyl group of 1–18 carbon atoms, preferably 1–6 carbon atoms, and more preferably 1–3 carbon atoms, which may be linear or branched and may have subsituents in addition to the hydroxyl (which itself may be primary, secondary, or tertiary), and n is 1 or 2, which may be substituted by one or more other substituents such as blocked amines or unsaturated groups. More preferably, R is —$C_mH_{2m}$OH where the hydroxyl may be primary or secondary and m is 1 to 8, and even more preferably, R is —$(CH_2)_p$—OH where the hydroxyl is primary and p is 1 to 2.

Lactones that can be ring opened by an active hydrogen are well-known in the art. They include, for example, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-nonanoic lactone, γ-octanoic lactone, and pentolactone. In one preferred embodiment, the lactone is ε-caprolactone. Lactones useful in the practice of the invention can also be characterized by the formula:

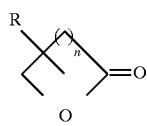

wherein n is a positive integer of 1 to 7 and R is one or more H atoms, or substituted or unsubstituted alkyl groups of 1–7 carbon atoms.

The lactone ring-opening reaction is typically conducted under elevated temperature (e.g., 80°-150° C.). The reactants are usually liquids so a solvent is not necessary. However, a solvent may be useful in promoting good conditions for the reaction even if the reactants are liquid. Any non-reactive solvent may be used, including both polar and nonpolar organic solvents. Examples of useful solvents include toluene, xylene, methyl ethyl ketone, methyl isobutyl ketone, and the like. A catalyst is preferably present. Useful catalysts include proton acids (e.g., octanoic acid, Amberlyst® 15 (Rohm & Haas)), and tin catalysts (e.g., stannous octoate). Alternatively, the reaction can be initiated by forming a sodium salt of the hydroxyl group on the molecules that react will react with the lactone ring.

The lactone ring-opening reaction provides chain extension of the molecule if sufficient amounts of the lactone are present. The relative amounts of the carbamate or urea compound (A')(1) and the lactone (A')(2) can be varied to control the degree of chain extension. The opening of the lactone ring with a hydroxyl or amine group results in the formation of an ester or amide and an OH group. The OH group can then react with another available lactone ring, thus resulting in chain extension. The reaction is thus controlled by the proportion of lactone in the relative to the amount of initiator compound (A')(1). In the practice of the present invention, the ratio of equivalents of lactone from (A')(2) to equivalents of active hydrogen groups on (A')(1) is preferably from 0.1:1 to 10:1, and more preferably from 1:1 to 5:1. When the lactone is opened with with an acid, the resulting compound has an acid group, which can then be converted to a hydroxyl group by well-known techniques such as reaction with ethylene oxide.

In another embodiment, the above-described compound that is the reaction product of a compound having at least one carbamate or urea group (or a group that can be converted to carbamate or urea) and an active hydrogen group (A')(1) with a lactone (A')(2) may be further reacted with a compound (A')(3) that is reactive with the hydroxyl groups on a plurality of molecules of that reaction product, but that is not reactive with the carbamate or urea groups thereon. Thus, in the final product, the residue of compound (A')(3) can be described as a core to which a plurality of carbamate- or urea-functional residues of (A')(1)(A')(2) reaction product are attached. It is also contemplated that the (A')(1)/(A')(2) reaction product may be admixed with other compounds comprising a hydroxyl group plus a carbamate or urea group (e.g., hydroxypropyl carbamate) prior to the reaction with compound (A')(3). In such a case, the resulting reaction product mixture will reflect the stoichiometric ratio of (A')(1)/(A')(2) reaction product to such other compounds.

Compounds that are useful as (A')(3) include polyisocyanates, dialkyl carbonates, cyclic carbonates, CO$_2$, acetals, phosgene, cyclic or linear phosphazene, substituted or unsubstituted cyclic siloxanes or silanes, or substituted or unsubstituted linear siloxanes or silanes, which may be described by the formula SiX$_m$R$_n$ where X is a group that is reactive with protons, such as a halide, alkoxy, hydride, or acetate, R is a group that is non-reactive with protons such as alkyl, silane, or siloxane, m=2–4, and m+n=4, SO$_2$, POCl$_3$, POCl2R where R is alkyl or aryl. With certain of the compounds (A')(3), a diol may also be included in the reaction mixture to obtain chain extension with carbamate or urea termination. This can be done, for example, with phosgene where the phosgene/diol reaction results in chain extension and the reaction of phosgene with the (A')(1)/(A') (2) reaction product results in chain termination with a carbamate or urea group.

The polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis- (cyclohexyl isocyanate) and isophorone diisocyanate. Useful aromatic diisocyanates and araliphatic diisocyanates include the various isomers of toluene diisocyanate, meta-xylylenediioscyanate and para-xylylenediisocyanate, also 4-naphthalene chloro-1,3-phenylene diisocyanate, 1,5-tetrahydro-diisocyanate, 4,4'-dibenzyl diisocyanate and 1,2,4-benzene triisocyanate can be used. In addition, the various isomers of α,α,α',α'-tetramethyl xylylene diisocyanate can be used. oligomeric or polymeric polyisocyanates prepared by reaction of an excess of monomeric polyisocyanates with a polyol may be used. Also, isocyanurates such as the isocyanurate of isophorone diisocyanate or the isocyanurate of hexamethylene diisocyanate may be used. Biurets of isocyanates such as DESMODUR® from Mobay may also be useful.

Dialkyl carbonates, cyclic carbonates, CO$_2$, diphenyl carbonates, or phosgene may be used as compound (A')(3) to react with and link two (A')(1)/(A')(2) reaction product compounds via a carbonate linking group. When phosgene is used, phosgene may be added to a solution of the (A')(1)/(A')(2) reaction product at a molar ratio of about 1 mole phosgene to 2 moles (A')(1)/(A')(2) reaction product (or 2 moles (A')(1)/(A')(2) reaction product plus other hydroxy carbamate or urea compounds such as hydroxypropyl carbamate). This reaction may be conducted at temperatures of less than 7° C. or under pressure in order to maintain phosgene in it's liquid state, or alternatively, gaseous phosgene may be bubbled through the system. A salting base (e.g., NaOH) may be used to help drive the reaction. The reaction may be conducted in virtually any aprotic solvent at temperatures of −20° C. to 80° C. and pressures of atmospheric to 40 psi.

Cyclic carbonates or dialkyl carbonates may be used as compound (A')(3) to react with the (A')(1)/(A')(2) reaction product by heating (e.g., 80°–200° C.) the appropriate molar mixture (2 moles (A')(1)/(A')(2) reaction product plus any other hydroxy carbamate or urea and 1 mole cyclic carbonate or dialkyl carbonate) with a transesterification catalyst such as calcium octoate. Useful dialkyl carbonates include diethyl carbonate, dimethyl carbonate, dipropyl carbonate, diphenyl carbonate, and dibutyl carbonate. Useful cyclic carbonates include propylene carbonate, glycerine carbonate, and dimethyl ethylene carbonate. Cyclic carbonates may also be formed from any unsaturated bond by reaction of the unsaturated bond with peroxide to form an oxirane ring, followed by reaction with CO$_2$ to form the cyclic carbonate. Useful catalysts include metal hydroxides (e.g., KOH), Group I or II metals (e.g., Na, Li), metal carbonates (e.g., K$_2$CO$_3$) which may be enhanced by use in combination with crown ethers, metal oxides (e.g., dibutyltin oxide), metal alkoxides (e.g., NaOCH$_3$, Al(OC$_3$H$_7$)$_3$), metal esters (e.g., stannous octoate, calcium octoate), or protic acids (e.g., H$_2$SO$_4$), MgCO$_3$, or Ph$_4$SbI. Any solvents used should be inert to transesterification. The catalysts and/or reaction conditions may need to be adjusted to minimize transesterification of the ester groups from the ring-opened lactone in the (A')(1)/(A')(2) reaction product. $CO_2$ may also be used as compound (A')(3) under similar conditions with similar catalysts plus it may be used at pressures of 1 to 40 atm.

Compounds having inorganic reactive groups may also be used to react with the hydroxyl groups of the (A')(1)/(A')(2) reaction product. These include phosphorus compounds such as $POCl_3$ or hexachlorocyclotriphosphazene, $SO_2$ sources such as $SO_3$ or $SO_2Cl_2$ or silane-based systems such as substituted or unsubstituted cyclic siloxanes or silanes, or substituted or unsubstituted linear siloxanes or silanes, which may be described by the formula $SiX_mR_n$ where X is a group that is reactive with protons, such as a halide, alkoxy, hydride, or acetate, R is a group that is non-reactive with protons such as alkyl, silane, or siloxane, m=2–4, and m+n=4.

Phosphorus-containing compounds such as phosphazene-based compounds (e.g., hexachlorocyclotriphosphazene) or $POCl_3$ may be used as compound (A')(3) to react with the (A')(1)/(A')(2) reaction product. In a typical reaction, one equivalent (based on chlorine content) of the phosphorus reagent is dissolved in a dry ether solvent such as diethyl ether of tetrahydrofuran to form a solution of approximately 50%. 1.5 equivalents of sodium hydride are added followed by one equivalent of the (A')(1)/(A')(2) reaction product (or (A')(1)/(A')(2) reaction product plus other hydroxy carbamate or urea compounds). The mixture is allowed to exotherm to the reflux temperature of the solvent, with the reaction temperature controlled by the addition rate of the (A')(1)/(A')(2) reaction product. After addition of the (A')(1)/(A')(2) reaction product is complete, the reaction mixture is heated to reflux and held for 2–3 hours. The mixture is then cooled, filtered to remove sodium chloride and any unreacted sodium hydride, and the solvent removed under vacuum.

Silane-based compounds may also be used as compound (A')(3). Such compounds may be described by the formula $SiX_mR_n$ where X is a group that is reactive with protons, such as a halide, alkoxy, hydride, or acetate, R is a group that is non-reactive with protons such as alkyl, silane, or siloxane, m=2–4, and m+n=4. These compounds may react with the (A')(1)/(A')(2) reaction product in any dry aprotic solvent (e.g., tetrahydrofuran) under conditions known in the art, which may depend on the nature of the X group. When X is a hydride, the reaction is preferably begun with chilled reactants (e.g., 0°C.) under an inert atmosphere using catalysts such as tin catalysts. After the addition of materials is complete, amd dry methanol is added to react with any free remaining Si—H bonds. If X is a halide, the reaction is preferably begun under an inert atmosphere at room temperature. The mixture is then heated to reflux to drive the reaction to completion. HCl is given off as a by-product. If X is alkoxy, the reaction is preferably begun under an inert atmosphere at room temperature, which may be maintained for the duration of the reaction. A molecular sieve may be used to absorb the alcohol side product that is formed. Slightly basic or acidic pH will accelerate this reaction; however, it will also accelerate the formation of Si—O—Si bonds.

For $SO_2$ sources, the $SO_3$ can be reacted with the (A')(1) by bubbling $SO_3$ through the (A')(1)/(A')(2) reaction product if it is in liquid form or by dissolving the (A')(1)/(A')(2) compound in a solvent and then bubbling $SO_3$ through the solution. The reaction of $SO_2Cl_2$ with the (A')(1)/(A')(2) compound may be assisted by the pre-reaction of the (A') (1)/(A')(2) compound with Na or NaOR (where R is an organic radical).

In another embodiment, the hydroxyl group on the (A') (1)/(A')(2) reaction product may be converted to carbamate or urea by reaction with a compound (A')(4), which is reactive with the (A')(1)/(A')(2) reaction product to convert a hydroxyl group thereon to a carbamate or urea group, or which comprises a group that is reactive with a hydroxyl group thereon and also a carbamate or urea group or group that can be converted to carbamate or urea.

A number of compounds may be used as compound (A')(4) to convert a hydroxyl group on the (A')(1)+(A')(2) reaction product to a carbamate group. Hydroxyl groups can be converted to carbamate groups by reaction with a monoisocyanate (e.g., methyl isocyanate) to form a secondary carbamate group or with cyanic acid to form a primary carbamate group (i.e., unsubstituted carbamates). This reaction is performed under heat, preferably in the presence of a catalyst as is known in the art. A hydroxyl group can also be reacted with phosgene and then ammonia to form a compound having primary carbamate group(s), or by reaction of a hydroxyl with phosgene and then a primary amine to form a compound having secondary carbamate groups.

Various compounds can be used as compound (A')(4) that have a group that is reactive with the hydroxyl group on the (A')(1)+(A')(2) reaction product and also a carbamate or urea group or a group that can be converted to carbamate or urea. Alkyl carbamates (e.g., methyl carbamate, butyl carbamate) or substituted alkyl carbamates (e.g., hydroxypropyl carbamate) can be transesterified with the hydroxyl group on the (A')(1)/(A')(2) reaction product. This reaction is performed under heat, preferably in the presence of a catalyst such as an organometallic catalyst (e.g., dibutyltin dilaurate). A methylol acrylamide can be reacted with the hydroxyl group on the (A')(1)+(A')(2) reaction product and then converted to carbamate. In this reaction, the unsaturated bond is then reacted with peroxide, $CO_2$, and ammonia as described above. The epoxy groups are then reacted with $CO_2$ to form cyclic carbonate groups, which are converted to carbamate groups by reaction with ammonia. Partially-blocked toluene diisocyanate can also be used as compound (A')(4). In one embodiment, the unblocked isocyanate on the partially-blocked toluene diisocyanate can be reacted with the hydroxyl group on the (A')(1)+(A')(2) reaction product. The other isocyanate can then be unblocked and reacted with a hydroxyalkyl carbamate (e.g., hydroxypropyl carbamate) or a hydroxy urea (e.g., hydroxyethyl ethylene urea). Alternatively, the unblocked isocyanate can be reacted with a hydroxyalkyl carbamate (e.g., hydroxypropyl carbamate) or a hydroxy urea (e.g., hydroxyethyl ethylene urea), followed by unblocking of the other isocyanate group and reaction with the hydroxyl group on the (A')(1)+(A')(2) reaction product. Other polyisocyanates can be used to append carbamate or urea groups onto the hydroxyl group on the (A')(1)+(A')(2) reaction product, but they will result in competing side reactions where the polyisocyanate reacts with more than one (A')(1)+(A')(2) molecule or more than one hydroxyalkyl carbamate or hydroxy urea.

In yet another embodiment, a polyol, amino alcohol, or polyamine (typically a diol or diamine, although polyols or polyamines of higher functionality may also be used) is reacted with a lactone or a hydroxy carboxylic acid to form a polyol having at least one ester or amide group derived from the lactone ring-opening reaction or the hydroxy carboxylic acid condensation reaction. The hydroxyl groups thereon can then be converted to carbamate or urea groups or reacted with a compound having carbamate or urea groups or groups that can carbamate or urea by any of the techniques described above. Polyols derived from lactone ring-opening reactions are commercially available (e.g., under the Tone® polyol product line of Union Carbide Corporation, such as Tone® 0200, Tone® 2221, Tone® 0301, or Tone® 0310) or may be prepared by ring opening a lactone with virtually any polyol or polyamine under the conditions described above for lactone ring opening. Useful polyols can include 1,4-butane diol, 1,6-hexane diol, urethane polyols (which may be formed by reaction of polyisocyanates with an excess of polyol or by the techniques described in U.S. Pat. No. 5,134,205 of Blank), dimer fatty alcohol, and the like. Useful polyamines can include isophorone diamine, bis-[diaminomethyl cyclohexane], bis-[4-aminophenyl methane], polyethylene imine (sold as Polymin® by BASF), and triamino nonane. Useful amino alcohols include hydroxyethyl amine, 5-amino-pentan-1-ol, and aminomethyl propanol.

Carbonate groups (A)(3) may also be incorporated into a carbamate- or urea-functional compound (A). In one technique, a compound as described above having a carbamate or urea group (or group that can be converted to carbamate or urea) and a hydroxyl group can be reacted with a $CO_2$ source (e.g., $CO_2$, dialkyl carbonate, cyclic carbonate, phosgene, diphenyl carbonate). The hydroxy carbamate or hydroxy urea compound may be any of the types described above as (A')(1) or it may be the the (A')(1)/(A')(2) reaction product. The $CO_2$ source and the reaction conditions are as described above with regard to the reaction of the (A')(1)/(A')(2) reaction product with (A')(3) when (A')(3) is $CO_2$, dialkyl carbonate, cyclic carbonate, phosgene, or diphenyl carbonate.

In another embodiment of the invention, the compound (A) (where (A)(3) is a carbonate group) is the reaction product of a substituted or unsubstituted alkyl carbamate (e.g., methyl carbamate, butyl carbamate, hydroxypropyl carbamate) with a polycarbonate having a plurality of hydroxyl groups attached thereto. Such polycarbonate polyols are known in the art and are described, for example, in U.S. Pat. No. 4,024,113, the disclosure of which is incorporated herein by reference. They can be prepared by the transesterification reaction of $CO_2$, a dialkyl carbonate, diphenyl carbonate, phosgene, or a dioxolanone with an excess of a polyol using techniques and catalysts as described above. Examples of useful polyols can include 1,6-hexane diol, 2-ethyl-1,3-hexane diol, neopentyl glycol, cyclohexane-1,4-dimethylol, bisphenol A, polyether polyols such as Pluronic® polyols sold by BASF Corporation, 1,2-hexane diol, and the like. Useful polyols of higher functionality include trimethylol propane, pentaerythritol, acrylic polyols, and the like.

The transesterification reaction between the carbamate compound and the polycarbonate polyol should utilize a catalyst. Such catalysts are known in the art, and are preferably organometallic complexes. Suitable catalysts include tin complexes, such as dibutyltin oxide, dibuyltin dilaurate, dibutyltin diacetate, dibutyltin dimethoxide. Other catalysts, such as aluminum complexes (e.g., aluminum isopropoxide), zinc complexes, titanates, or acid catalysts (e.g., octanoic acid) can also be used. The catalysts and/or reaction conditions may need to be adjusted to minimize interaction with the carbonate groups in the (A)(1) compound.

In yet another embodiment, the compound (A) containing carbonate group(s) (A)(3) can be formed by the above-described standard polyesterification techniques involving a polyol and a $CO_2$ source (e.g., ethylene carbonate, diethyl carbonate, $CO_2$) or phosgene, where the polyol includes a diol having a pendant carbamate group or a pendant urea group. Diols having a pendant carbamate group can be formed by ring-opening a hydroxyalkyl-substituted cyclic carbonate with ammonia or a primary amine using known techniques. Diols having a pendant urea group can be formed by ring-opening a hydroxyalkyl-substituted oxazolidone with ammonia or a primary amine using known techniques.

Compound (A) may also contain ether group(s) as group (A)(3). A carbamate- or urea-functional ether-containing compound may be prepared by using a compound having a carbamate or urea group (or group that can be converted to carbamate or urea) and an active hydrogen group as described above to ring-open an oxirane group on ethylene oxide or propylene oxide in the presence of a catalyst. This reaction is very well-known in the art, and further detailed explanation herein is not necessary for one skilled in the art to practice this aspect of the invention. As with the ring-opening reaction of the lactone, the degree of polyether extension can be controlled by stoichiometry, with the degree of chain extension proportionate to the amount of ethylene oxide or propylene oxide. Alternatively, the hydroxyl groups on a polyether polyol may be transesterified with an alkyl carbamate or reacted with cyanic acid as described above to provide carbamate functionality.

Carbamate- or urea-functional polyurethanes can be prepared by reacting an NCO-terminated polyurethane with a hydroxy carbamate (e.g., hydroxypropyl carbamate) or a hydroxy urea (e.g., hydroxyethyl ethylene urea) using techniques described in U.S. Pat. No. 5,373,069 or by including a carbamate or urea diol (which may be formed by ring-opening a hydroxyalkyl cyclic carbonate or a hydroxyalkyl oxazolidone with ammonia or a primary amine). Polyols other than polyester polyols, which contain hydrogen bond acceptor groups (e.g., polyether polyols, polycarbonate polyols, although it its contemplated that in one embodiment of the invention, polyurethanes derived from polyether polyols are also excluded from the scope of (A) compounds) may be included in the polyol component in the formation of the polyurethane. Alternatively, hydrogen bond acceptor groups may be incorporated, for example, by reacting a compound containing a hydroxyl group and a hydrogen bond acceptor group onto one of the NCO groups on an isocyanurate and then utilizing the other two NCO groups to take part in the polyurethane reaction with a polyol.

Other hydrogen bond acceptor groups can be incorporated into carbamate- or urea-functional compounds by various techniques well-known in the art, such as reacting a polyol containing the desired hydrogen bond acceptor group with cyanic acid or phosgene followed by ammonia to form the carbamate derivative. For example, a sulfide-containing compound can be prepared by reacting a sulfide-containing polyol (e.g., 2,2'-thiodiethanol) with cyanic acid or phosgene/ammonia. Likewise, a sulfone-containing compound can be prepared by reacting a sulfone-containing polyol (e.g., 2,2'-sulfonyldiethanol) with cyanic acid or phosgene/ammonia. Also, a tertiary amine-containing carbamate compound may be prepared by reacting a tertiary amine polyol (e.g., triethanol amine) with cyanic acid or phosgene/ammonia to form the carbamate derivative. Glycolaldehyde dimer can be reacted with cyanic acid or phosgene/ammonia to form a heterocyclic ether-containing carbamate compound. Tertiary amide compounds may be prepared by reacting a tertiary amide polyol (e.g., N,N,N', N'-tetramethyl-D-tartaramide with cyanic acid or phosgene/ammonia. Unsaturate-containing carbamate compounds can be prepared by reacting an unsaturated polyol (e.g., 5-hexene-1,2-diol) with cyanic acid or phosgene/ammonia as well. A ketone-containing compound may be prepared by reacting a ketone polyol (e.g., erythrulose) with cyanic acid or phosgene/ammonia.

Carbamate- or urea-functional compounds containing such other hydrogen bond acceptor groups can also be prepared from compounds containing the hydrogen bond acceptor group and a single active hydrogen group by partially reacting a isocyanurate compound with two moles of a compound such as hydroxypropyl carbamate or hydroxyethyl ethylene urea and one mole of the hydrogen bond acceptor compound. Examples of hydrogen bond acceptor compounds useful in such a synthesis technique include 1-hydroxycyclohexyl phenyl ketone, 2-hydroxyethyl-2-pyrrolidone, 3-hydroxyl-methylpiperidine, diacetone alcohol, diacetin, 2-hydroxymethyl-12-crown-4, 4-(2-hydroxyethyl)-morpholine.

Combinations of the above-described types of hydrogen bond acceptor groups may be used in carbamate- or urea-functional compounds according to the invention. This occurs, for example, if 4-(2-hydroxyethyl)-morpholine is incorporated into a carbamate- or urea-functional compound as described above. Another example of a combination of hydrogen bond acceptor groups occurs if two (A')(1)/(A')(2) ester-containing carbamate compounds are linked together with $CO_2$ as (A)(3) to form a carbonate linkage, thus forming a compound containing both ester and carbonate hydrogen bond acceptor groups.

The composition of the invention is cured by a reaction of the carbamate- or urea-functional compound (A) with a component (B) that is a compound having a plurality of functional groups that are reactive with the carbamate or urea groups on component (A). Such reactive groups include active methylol or methylalkoxy groups on aminoplast crosslinking agents or on other compounds such as phenol/formaldehyde adducts, siloxane or silane groups, and anhydride groups. Examples of (B) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), N-methylol acrylamide emulsions, isobutoxy methyl acrylamide emulsions, polyanhydrides (e.g., polysuccinic anhydride), and siloxanes or silanes (e.g., dimethyldimethoxy silane). Aminoplast resin such as melamine formaldehyde resin or urea formaldehyde resin are especially preferred. Also preferred are aminoplast resins where one or more of the amino nitrogens is substituted with a carbamate group for use in a process with a curing temperature below 150° C., as described in U.S. Pat. No. 5,300,328.

A solvent may optionally be utilized in the coating composition used in the practice of the present invention. The coating composition according to the present invention can be applied without solvent, especially if the degree of chain extension for component (A) is limited. However, in many cases, it is desirable to use a solvent in the coating composition as well. This solvent should act as a solvent with respect to both the carbamate- or urea-functional compound (A) as well as the component (B). In general, depending on the solubility characteristics of components (A) and (B), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, amyl acetate, ethylene glycol butyl ether-acetate, propylene glycol monomethyl ether acetate, xylene, N-methylpyrrolidone, or blends of aromatic hydrocarbons. In another embodiment, the solvent can be water or a mixture of water with co-solvents.

The coating composition used in the practice of the invention may include a catalyst to enhance the cure reaction. For example, when aminoplast compounds, especially monomeric melamines, are used as component (B), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

Although a solvent may be present in the coating composition in an amount of from about 0.01 weight percent to about 99 weight percent, it is preferably present in an amount of less than 30%, more preferably less than 20% and most preferably less than 10%. The coating composition preferably has a VOC (VOC is defined herein as VOC according to ASTM D3960) of less than 3.0 lbs/gal, more preferably less than 2.0 lbs/gal, and most preferably less than 1.0 lbs/gal.

Coating compositions can be coated on the article by any of a number of techniques well-known in the art. These include, for example, spray coating, dip coating, roll coating, curtain coating, and the like. For automotive body panels, spray coating is preferred. One advantage that can be achieved with coating compositions according to the invention is that coatings with a high degree of flexibility can be prepared. Accordingly, in a preferred embodiment, the substrate onto which the coating is applied is flexible, such as plastic, leather, or textile substrates.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

In one preferred embodiment, the coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80. In other preferred embodiments, the coating composition may be utilized to prepare high-gloss or low-gloss primer or enamel coatings.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 2% to 350%, based on the total weight (not including solvent) of components A and B (i.e., a P:B ratio of 0.02 to 3.5).

When the coating composition according to the invention is used as the clearcoat of a composite color- plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and siloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross- linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The coating composition according to the present invention is curable even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15–60 minutes, and preferably 15–25 minutes for blocked acid catalyzed systems and 10–20 minutes for unblocked acid catalyzed systems.

The invention is further described in the following examples.

Preparation 1

A clean 12-liter three-necked round bottomed flask was equipped with an agitator, condenser, thermocouple, and nitrogen line. To this apparatus were added 6033 g ε-caprolactone, 2516 g hydroxypropyl carbamate, 450 g toluene, and 15 g stannous octoate. The mixtured was stirred under nitrogen atmosphere and heated to a temperature of 130° C. Temperature was maintained for a period of 6 hours to complete the synthesis, and then cooled.

Preparation 2

A clean 5-liter three-necked round-bottomed flask was equipped with an agitator, condenser, thermocouple and nitrogen line. To this apparatus was added, 2092 g of the resin from Preparation 1 and 412 g 1,6-hexamethylene diisocyanate under nitrogen atmoshere. The mixture was slowly heated to 60° C. at which point the mixture exothermed. The mixture was cooled such that a maximum exotherm temperature of 99° C. was reached, after which a batch temperature of 86° C. was maintained for a period of 4.25 hours. The mixture was cooled and diluted with 286.7 g n-butyl acetate.

Example 1

A clearcoat was prepared by mixing 166 g of the component from Preparation 2, 33.7 g monomeric fully methylated melamine, 5.22 g of a solution of blocked dodecylbenzyl sulfonic acid (25% active), 5.22 g Tinuvin® 1130, 0.87 g polyacrylate additive solution, 1.45 g surface modifier additive solution, 4.25 g n-butyl acetate, and 42.5 g ethylene glycol butyl ether acetate.

The mixture was spray-applied to a variety of substrates using a conventional air atomization siphon gun. Both rigid and flexible substrates were coated. A portion of the panels were applied wet on wet over conventional high solids basecoat. For these systems the basecoat was applied, followed by a 10 minute 200° F. flash. After cooling, the coating mixture was applied directly to the basecoat. After an additional 15 minutes ambient flash, the panels were baked at 250° F. for 30 minutes. The measured V.O.C. of the clearcoat mixture was found to be 3.07 lb/gal.

Comparative Example

A mixture of 139.9 parts of hydroxy propyl carbamate, 98.8 parts of hexamethylene diisocyanate, 10.5 parts of toluene, and 10.5 parts of stannous octoate were heated under inert atmosphere to initiate the exothermic reaction. The reaction temperature was allowed to reach 100° C. As the reaction progressed, the reaction product precipitated out of solution. After the reaction was complete (as determined by IR spectra), 28.5 parts of butyl acetate was added, and the system heated to 120° C. to dissolve the reaction mixture. Upon cooling, a hard, waxy solid was obtained.

The above product was unsuccessfully attempted to be incorporated into a liquid coating composition as follows. To 25.8 parts of Resimene® 747 (a methoxylated melamine from Monsanto), was added 80.8 parts of the above product that was first melted out (<100° C.). The system was allowed to cool before addition of the dodecyl benzene sulfonic acid catalyst. However, during the cooling period, the mixture solidified into a hard waxy solid.

Preparation 3

A clean 5-liter three-necked round bottomed flask was equipped with an agitator, condenser, thermocouple, and nitrogen line. To this apparatus was added 1735.0 g ε-caprolactone, 761.9 g hydroxypropyl carbamate, 234 g xylene, and 4.4 g stannous octoate. The mixtured was stirred under nitrogen atmosphere and heated to a temperature of 130° C. Temperature was maintained for a period of 6 hours to complete the synthesis, and then cooled.

Example 2 - Coating Composition

A clearcoat composition was prepared by mixing 1000 g of Preparation 3, 337.4 g monomeric fully metholated melamine, and 6.1 g dodecylbenzyl sulfonic acid.

This composition was spray-applied to a variety of substrates using a conventional air atomization siphon gun. Both rigid and flexible substrates were coated. A portion of the panels were applied wet on wet over conventional high solids basecoat. For these systems, the basecoat (an industry standard high-solids OH acrylic/melamine system) was applied, followed by a 10-minute ambient flash, at which point the above-described coating composition was applied. After an additional 5 minutes ambient flash, the panels were baked at 250° F. for 30 minutes.

The coating composition of the Example resulted in a contiguous cured hard clear film. The measured VOC of the clearcoat mixture was found to be 1.2 lbs/gal.

Preparation 4

A three-necked 1-liter flask was equipped with an agitator, thermocouple, nitrogen line, and condenser. To the flask were added 59.5 parts Hydroxypropyl carbamate, 171.2 parts ε-caprolactone, 98.8 parts xylene, and 0.4 parts stannous octoate under nitrogen atmosphere. The mixture was heated to 130° C. for a period of 10 hours, at which point 0.2 parts additional stannous octoate were added. The mixture was heated to 145° C. for a period of 1 hour and cooled.

Preparation 5

A three-necked 1-liter flask was equipped with agitator in the center neck, a thermocouple and nitrogen line in one neck and a trap in the third to condense and collect volatiles with a mixture of dry ice and isopropanol.

125.0 parts of Preparation 4 11.2 parts diethyl carbonate, and 4.0 parts dibutyltin dimethoxide were added to the flask under nitrogen amtosphere. Heat was applied such that temperature was maintained around 100° C. for three hours during which time volatiles were collected in the trap. Recovered ethanol as well as diethyl carbonate distilled to trap were monitored by gas chromatograph. Periodically, additions of diethyl carbonate were made to the flask to replenish loss to the trap. The mixture was heated for an additional period of 10.5 hours at temperatures ranging from 90°–132° C. with continued monitoring of recovered ethanol and replenishment of diethyl carbonate as needed.

The resulting resin was reduced with 29.8 parts amyl acetate.

Example 3

A clearcoat was prepared by combining 10 parts Preparation 5, 2 parts Resimene® 747, 1.8 parts Solvesso® Aromatic 100 solvent mixture, and 0.48 parts docecylbenzylsulfonic acid. Once homogenious, the mixture was drawn over a glass plate, and cured at 250° F. for 30 minutes. The result was a tough, flexible, solvent- resistant coating.

Preparation 6

In a three necked three liter flask equipped with an agitator, thermocouple, nitrogen line, and condenser, were added 841.5 g hydroxypropyl carbamate, 806.9 g ε-caprolactone, and 2.8 g stannous octoate under nitrgen atmosphere. The mixture was heated to a temperature of 130° C. for a period of 5.5 hours and then cooled to room temperature.

Preparation 7

To 200 parts of Preparation 6 was added 102.7 parts of urea, and 1.6 parts of triethylene diamine. The system was heated to 130° C. and held for 1 hour. The system was then heated to 140° C. for 5.5 hours. This resulted in the formation of cyanic acid from the thermal decomposition of the urea, which reacted with the hydroxyl groups on the Preparation 1 compound form carbamate groups. The resulting solid product was washed with ethyl acetate, disolved in methylene chloride, and filtered. The methylene chloride was then removed by evaporation to yield the final product.

Example 4

The following components were mixed and drawn down on glass substrate to form an 8 mm-thick layer:

6.2 g Preparation 7
1.7 g Resimene® 747 melamine resin
0.04 g dodecylbenzene sulfonic acid
10 g amyl acetate The coated glass substrate was baked at 250° F. for 30 minutes, resulting in a clear tack-free film that passed 200 methylethyl ketone double rubs with only surface scratches. The invention has been described in detail with reference to preferred embodiments thereof. It should be understood, however, that variations and modifications can be made within the spirit and scope of the invention.

What is claimed is:

1. A curable coating composition comprising
   (A) a multi-functional compound comprising
      (1) at least one carbamate functional group having the structure

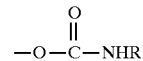

or urea functional group having the structure

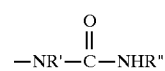

wherein R, R', and R" each independently represent H or alkyl or R' and R" together form a heterocyclic ring structure,
      (2) at least one other functional group which may or may not be carbamate or urea, and
      (3) at least one hydrogen bond acceptor group that is not also a hydrogen bond donor group, wherein said hydrogen bond acceptor group is selected from the group consisting of esters, ethers, ketones, carbonates, tertiary amines, thiones, sulfones, tertiary amides, sulfides, polyesters, polyethers, polycarbonates, and mixtures thereof, with the proviso that said multi-functional compound is other than an acrylic polymer or oligomer having carbamate functional or urea groups appended to the acrylic backbone through acrylic ester side chains, a polyester polymer or oligomer that is the polycondensation reaction product of a polyol and a polyacid component, or a polyurethane that is the reaction product of a polyisocyanate component and a polyester polyol component, and
   (B) a curing agent comprising a plurality of groups that are reactive with the functional groups on compound (A).

2. A coating composition according to claim 1 wherein group (A)(1) is a carbamate group.

3. A coating composition according to claim 2 wherein R represents H.

4. A coating composition according to claim 2 wherein group (A)(2) is a carbamate group having the structure

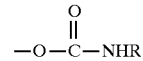

wherein R represent H or alkyl.

5. A coating composition according to claim 3 wherein the R of group (A)(2) represents H.

6. A coating composition according to claim 1 wherein group (A)(1) is a urea group.

7. A coating composition according to claim 6 wherein represents H.

8. A coating composition according to claim 6 wherein group (A)(2) is a urea group having the structure

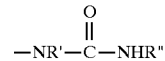

wherein R' and R" each independently represent H or alkyl or R' and R" together form a heterocyclic ring structure.

9. A coating composition according to claim 7 wherein the R" of group (A)(2) represent H.

10. A coating composition according to claim 1 wherein said group (A)(3) is selected from the group consisting of ester groups, ether groups, ketone groups, carbonate groups, tertiary amine groups, tertiary amide groups, sulfone groups, and sulfide groups.

11. A coating composition according to claim 1 wherein said group (A)(3) is an ester or polyester group, a carbonate or polycarbonate group, an ether or polyether group, or a ketone group.

12. A coating composition according to claim 1 wherein said group (A)(3) is an ester or polyester group.

13. A coating composition according to claim 1 wherein said group (A)(3) is a carbonate or polycarbonate group.

14. A coating composition according to claim 12 wherein said (A)(3) is: an ester moiety having 1–9 ester linkages.

15. A coating composition according to claim 14 wherein there are 1–3 linear carbon atoms between said ester linkages.

16. A coating composition according to claim 14 wherein there are 4–6 linear carbon atoms between said ester linkages.

17. A coating composition according to claim 14 wherein there are 7–12 linear carbon atoms between said ester linkages.

18. A coating composition according to claim 1 having a VOC of less than 3.0 lbs/gal.

19. A coating composition according to claim 1 having a VOC of less than 2.0 lbs/gal.

20. A coating composition according to claim 1 having a VOC of less than 1.0 lbs/gal.

21. A coating composition according to claim 1 that is a liquid and comprises less than 30 weight percent of nonreactive organic solvent.

22. A coating composition according to claim 16 that is a liquid and comprises less than 20 weight percent of nonreactive organic solvent.

23. A coating composition according to claim 16 that is a liquid and comprises less than 10 weight percent of nonreactive organic solvent.

24. A coating composition according to claim 1 that is a clear coating composition.

25. A coating composition according to claim 1, further comprising a pigment.

26. A coating composition according to claim 1 wherein compound (B) is an aminoplast.

27. A coating composition according to claim 26 wherein the amminoplast is a melamine resin.

* * * * *